(12) United States Patent
Odaira

(10) Patent No.: US 8,780,384 B2
(45) Date of Patent: Jul. 15, 2014

(54) SELECTION OF JOB IMAGE DATA FOR STORAGE ON EXTERNAL MEMORY AND MEMORY MANAGEMENT TECHNIQUES

(75) Inventor: Masahiro Odaira, Kawasaki (JP)

(73) Assignee: Canon Kabushiki Kaisha (JP)

( * ) Notice: Subject to any disclaimer, the term of this patent is extended or adjusted under 35 U.S.C. 154(b) by 559 days.

(21) Appl. No.: 12/502,450

(22) Filed: Jul. 14, 2009

(65) Prior Publication Data

US 2010/0007920 A1 Jan. 14, 2010

(30) Foreign Application Priority Data

Jul. 14, 2008 (JP) ................................. 2008-182722

(51) Int. Cl.
*G06F 3/12* (2006.01)
*G06K 15/00* (2006.01)
*H04N 1/00* (2006.01)

(52) U.S. Cl.
USPC ........ 358/1.15; 358/1.13; 358/1.14; 358/1.16; 358/403; 358/404; 358/426.05; 358/426.06

(58) Field of Classification Search
None
See application file for complete search history.

(56) References Cited

U.S. PATENT DOCUMENTS

| | | | | |
|---|---|---|---|---|
| 5,854,693 | A * | 12/1998 | Yoshiura et al. | 358/468 |
| 5,930,003 | A * | 7/1999 | Kondo | 358/404 |
| 2006/0177213 | A1 * | 8/2006 | Okamoto | 396/263 |
| 2006/0268310 | A1 * | 11/2006 | Tamai et al. | 358/1.14 |
| 2008/0212421 | A1 * | 9/2008 | Kitagawa et al. | 369/47.12 |

FOREIGN PATENT DOCUMENTS

| | | | |
|---|---|---|---|
| JP | 02-288661 | A | 11/1990 |
| JP | 05-334056 | A | 12/1993 |
| JP | 06-274388 | A | 9/1994 |
| JP | 8-265527 | A | 10/1996 |
| JP | 2001-306366 | A | 11/2001 |
| JP | 2002010004 | * | 1/2002 |
| JP | 2002-247266 | A | 8/2002 |
| JP | 2007-030252 | A | 2/2007 |
| JP | 2007-67476 | A | 3/2007 |
| JP | 2007-268784 | A | 10/2007 |
| JP | 2009083419 | * | 4/2009 |

OTHER PUBLICATIONS

Konishi Daishi; "Original Reader/Recorder"; JP Pub Date Jan. 2002; Machine Translation in English of JP Pub 2002010004.*
Machine Translation of JP 2002-010004 to Konishi Daishi.*
Machine translation of JP Pub 05-334056 to Nobuyuki et al.*
Machine translation of JP Pub 2009-083419 to Miyazawa Masafumi.*

(Continued)

*Primary Examiner* — Benny Q Tieu
*Assistant Examiner* — Haris Sabah
(74) *Attorney, Agent, or Firm* — Rossi, Kimms & McDowell, LLP

(57) ABSTRACT

An image processing apparatus capable of efficiently using a removable medium when the removable medium is used instead of a memory provided in the image processing apparatus. The apparatus includes a RAM for storing image data, a removable medium I/F to which the removable medium is coupled, and a CPU. The CPU confirms the remaining capacity of the RAM and determines based on the remaining capacity confirmed during execution of a job and a job operation mode whether the job can be continued by using only the RAM. When it is determined that the job cannot be continued, image data to be saved is selected according to a predetermined priority order, and the selected image data is saved from the RAM onto the removable medium.

16 Claims, 15 Drawing Sheets

(56) References Cited

OTHER PUBLICATIONS

Machine translation of JP Pub 2002010004 to Konishi Daishi.*

Japanese Office Action cited in Japanese counterpart application No. JP2008-182722, dated Mar. 26, 2013.
Japanese Office Action cited in Japanese counterpart application No. JP2008-182722, dated Sep. 17, 2013.

* cited by examiner

*FIG.8*

| PRIORITY ORDER | JOB |
|---|---|
| 1 | COPY |
| 2 | FAX TRANSMISSION |
| 3 | PRINT |
| 4 | FAX RECEPTION |
| 5 | REPORT |

SELECTION OF JOB IMAGE DATA FOR STORAGE ON EXTERNAL MEMORY AND MEMORY MANAGEMENT TECHNIQUES

BACKGROUND OF THE INVENTION

1. Field of the Invention

The present invention relates to an image processing apparatus and method capable of using a removable medium for storage of image data, and a storage medium storing a computer program for execution of the image processing method.

2. Description of the Related Art

In a conventional image processing apparatus such as a multi-function peripheral, image data read by a scanner or received by a FAX machine or the like is stored into a memory such as a RAM and a hard disk of the image processing apparatus. To increase the image data storage capacity, an additional RAM or hard disk must be added to the apparatus, which requires technical knowledge.

To obviate this, an image forming apparatus capable of using a removable medium for storage of image data has been proposed (Japanese Laid-open Patent Publication No. 2007-67476). Removable media have recently been gained widespread use, and special technical knowledge to utilize them has become less needed.

Japanese Laid-open Patent Publication No. 8-265527 proposes a technique for saving image data into an external storage unit, if there is no sufficient free space in the RAM or hard disk for storage of image data as a result of image being unable to be output due to a printer abnormality or the like. When the printer is restored to its normal state, the saved image data is retrieved from the external storage unit and image output is continued.

However, the removable medium has a nature that it is lower in access speed and much restricted in the number of writable (erasable) times as compared to the RAM and hard disk.

When the removable medium is used for storage of image data, therefore, image data saving and retrieval must be made efficiently, and image data to be saved and retrieved must be selected in consideration of the nature of removable medium to maintain the performance of image processing apparatus.

SUMMARY OF THE INVENTION

The present invention provides an image processing apparatus and method capable of efficiently using a removable medium when it is used instead of a memory provided in the image processing apparatus, and a storage medium storing a program for execution of the image processing method.

According to a first aspect of this invention, an image processing apparatus is provided, which comprises a storage unit adapted to store image data, an interface unit adapted to be coupled with a removable medium, a confirmation unit adapted to confirm a remaining capacity of the storage unit, a determination unit adapted, based on a result of confirmation by the confirmation unit, to determine whether execution of a job using the storage unit can be continued, a selection unit adapted to select image data to be saved from the storage unit onto the removable medium via the interface unit in accordance with a predetermined first priority order when it is determined by the determination unit that the job cannot be continued, and a save unit adapted to save the image data selected by the selection unit from the storage unit onto the removable medium via the interface unit.

According to a second aspect of this invention, an image processing method is provided, which comprises a storage step of storing image data into a storage unit, a confirmation step of confirming a remaining capacity of the storage unit, a determination step of determining based on a result of confirmation in the confirmation step whether execution of a job using the storage unit can be continued, a selection step of selecting image data to be saved from the storage unit onto a removable medium in accordance with a predetermined first priority order when it is determined in the determination step that the job cannot be continued, and a save step of saving the image data selected in the selection step from the storage unit onto the removable medium.

According to a third aspect of this invention, there is provided a computer-readable storage medium storing a program for causing a computer to execute the image processing method according to the second aspect of this invention.

With the present invention, when a removable medium is used instead of a memory provided in an image processing apparatus, the removable medium can efficiently be used.

Further features of the present invention will become apparent from the following description of an exemplary embodiment with reference to the attached drawings.

BRIEF DESCRIPTION OF THE DRAWINGS

FIG. 8 is a view showing an example of the order of job priority referred to at the image data selection shown in FIG. 7;

DETAILED DESCRIPTION OF THE PREFERRED EMBODIMENT

The present invention will now be described in detail below with reference to the drawings showing a preferred embodiment thereof.

Figure 1:
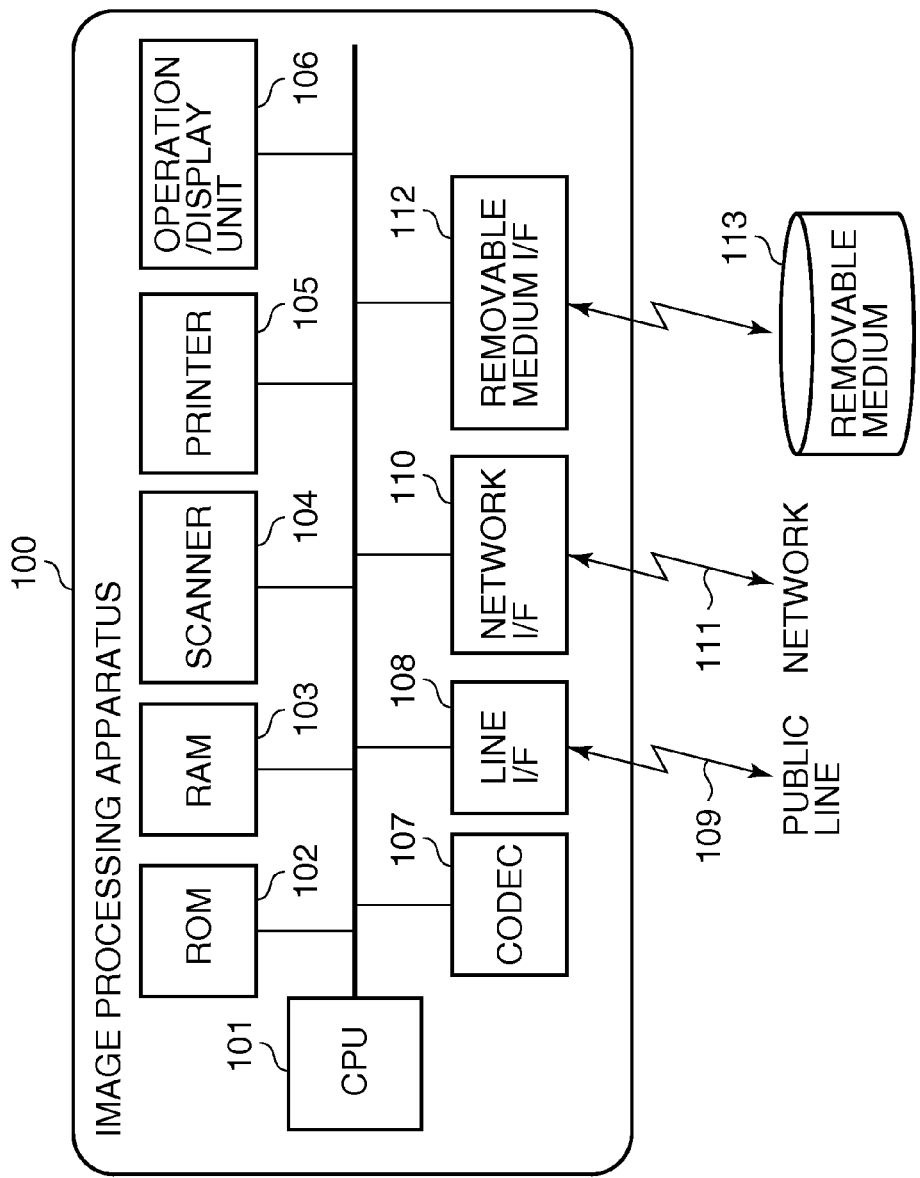
FIG. 1 is a block diagram showing the construction of an image processing apparatus according to one embodiment of this invention.

FIG. 1 shows in block diagram the construction of an image processing apparatus according to one embodiment of this invention.

As shown in FIG. 1, the image processing apparatus 100 includes a CPU 101, ROM 102, RAM 103, scanner 104, printer 105, operation/display unit 106, codec 107, line I/F 108, network I/F 110, and removable medium I/F 112.

The following is a description of these modules of the image processing apparatus 100.

The CPU 101 is a system controller that controls the entire image processing apparatus 100.

The ROM 102 stores a control program in accordance with which the CPU 101 executes control operations described later.

The RAM 103 stores an execution program, program control variables, work buffers, etc., and stores setting values, management data, etc., registered by a user of the image processing apparatus 100. The RAM 103 functions as a storage unit that stores image data.

The scanner 104 is comprised of a CS image sensor, an original conveyance mechanism, etc., and adapted to optically read an original and covert the read data into electrical image data.

The printer 105 is adapted to record reception data or file data onto a recording sheet.

The operation/display unit 106 is comprised of a keyboard, touch panel, LCD, LEDs, etc., and adapted to be operated by the user for various operations and to display a notification to the user.

The codec 107 is a module for encoding and decoding JBIG, JPEG, etc., and performing compression and decompression of image data in accordance with predetermined standard.

The line I/F 108 is comprised of a modem (modulator-demodulator), an NCC (network control unit), etc., and adapted to perform FAX transmission/reception via a public line 109.

The network I/F 110 is adapted to transmit and receive an e-mail or other data via a network 111.

The removable medium I/F 112 is coupled with a removable medium 113 and adapted to read and write image data. The removable medium I/F 112 functions as an interface unit for storing image data onto the removable medium 113.

Examples of the removable medium 113 in this embodiment include a magnetic disk such as a floppy (registered trademark) disk, an optical disk such as a CD and a DVD, and a semiconductor memory such as a USB memory and a memory card. The removable medium may be implemented by any other memory, which is removable from the drive and transportable.

Figure 2:
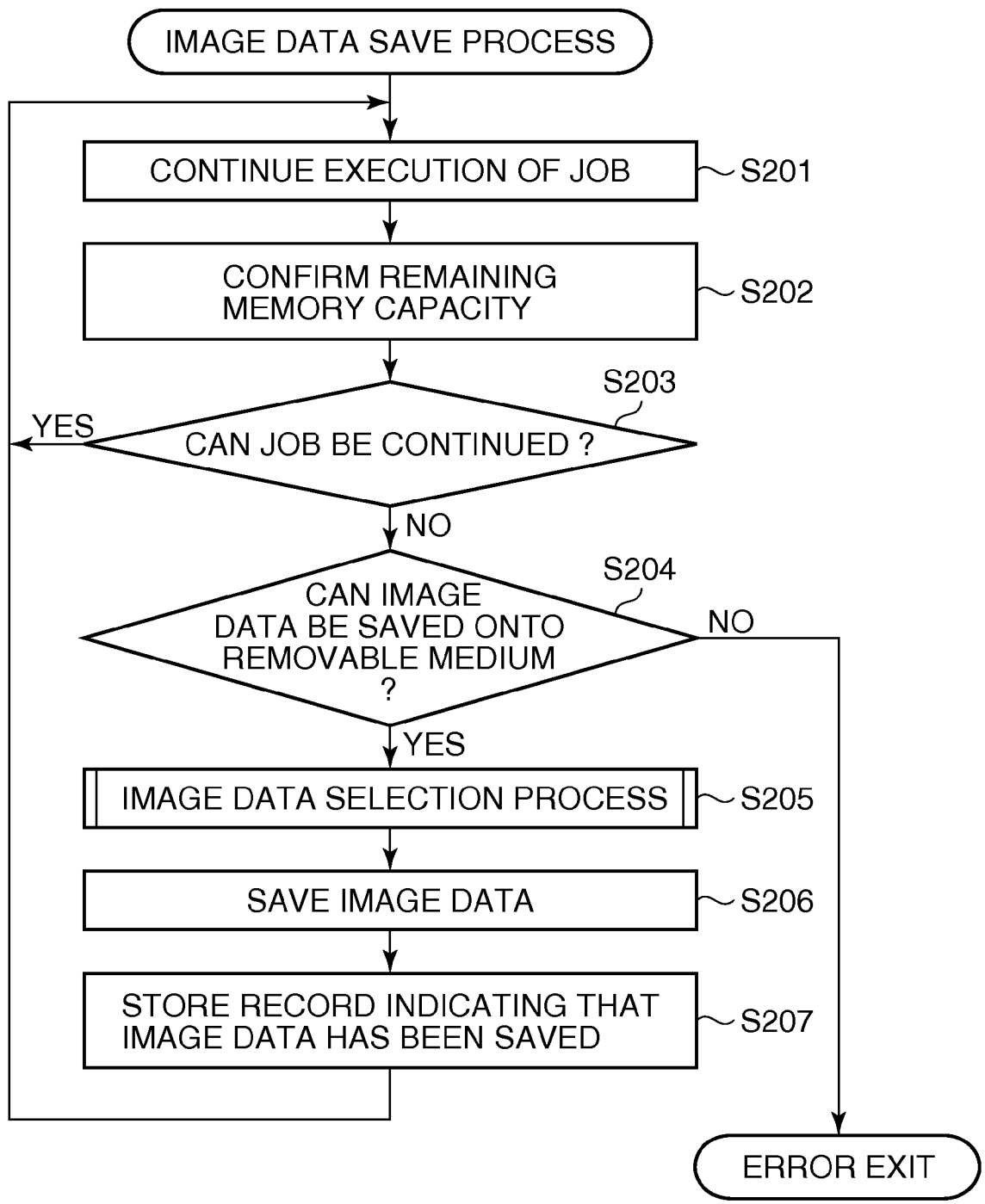
FIG. 2 is a flowchart showing the procedures of an image data save process performed by a CPU of the image processing apparatus in FIG. 1 to save image data from a RAM onto a removable medium.

FIG. 2 shows in flowchart the procedures of an image data save process executed by the CPU 101 of the image processing apparatus 100 to save image data from the RAM 103 onto the removable medium 113.

Referring to FIG. 2, the CPU 101 continues execution of a job using the RAM 103 (step S201).

In step S202, the CPU 101 confirms a remaining memory capacity. Based on the remaining memory capacitor confirmed in step S202 and a job operation mode, the CPU 101 determines whether the job can be continued using only the RAM 103 (step S203).

Figure 3A:
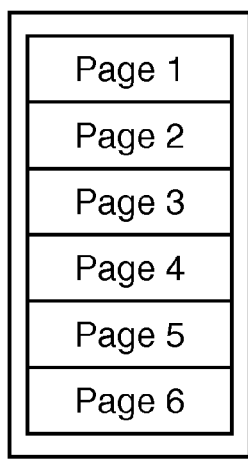
FIGS. 3A to 3C are views showing an example change in the stored content of the RAM during execution of a copy job for which multiple-set copying and sort-OFF are set.
Figure 3B:
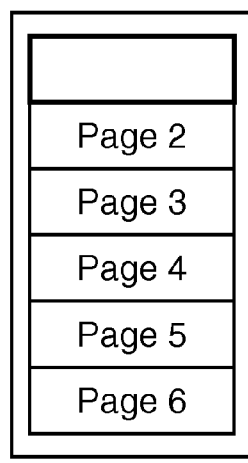
Figure 3C:
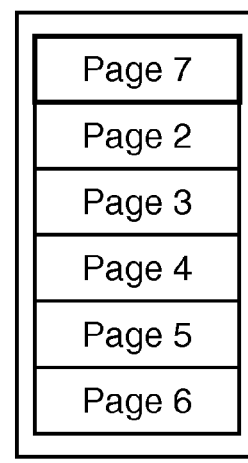

FIGS. 3A to 3C show an example change in the stored content of the RAM 103 during execution of a copy job for which multiple-set copying and sort-OFF are set.

FIG. 3A shows a state where the RAM 103 becomes memory full before image data of all pages for the copy job have been stored into the RAM 103. During execution of the copy job for which sort-OFF is set, when multiple sets of some page (e.g., the first page) have been copied, image data of that page can be erased from the RAM 103 to create a free space in the RAM 103 for storage of image data for the next page as shown in FIGS. 3B and 3C. At that time, the CPU 101 determines that the job can be continued.

Figure 4:
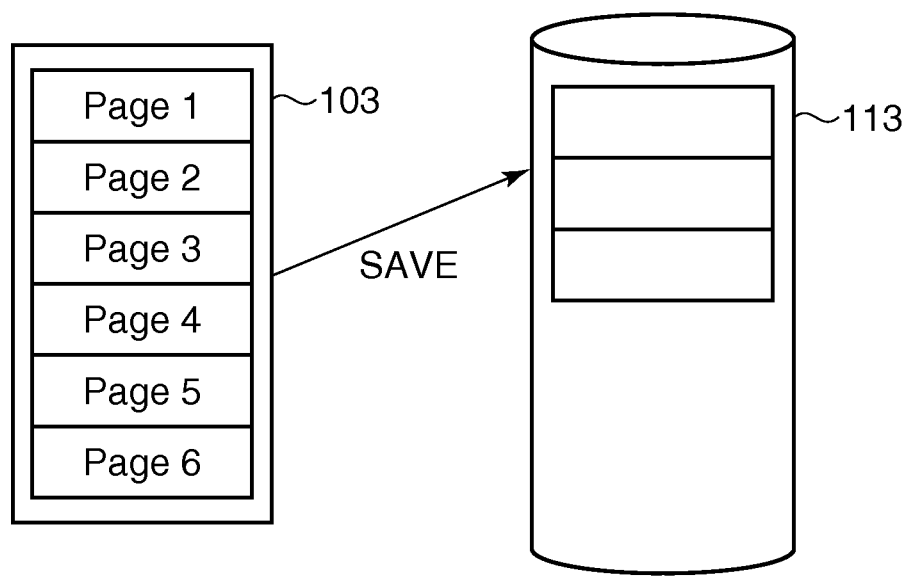
FIG. 4 is a view showing an example where image data in the RAM is saved onto the removable medium during execution of a copy job for which multiple-set copying and sort-ON are set.

FIG. 4 shows an example where image data is saved from the RAM 103 onto the removable medium 113 during execution of a copy job for which multiple-set copying and sort-ON are set.

During execution of the copy job for which sort-ON is set, when the remaining memory capacity of the RAM 103 becomes small and further storage of image data into the RAM 103 is no longer possible as shown in FIG. 4, the CPU 101 determines that the job cannot be continued, and saves image data from the RAM 103 onto the removable medium 113 according to the following processing.

Referring to FIG. 2 again, when determining in step S203 that the job can be continued, the CPU 101 returns to step S201 to continue the job.

On the other hand, when determining in step S203 that the job cannot be continued, the CPU 101 determines whether image data in the RAM 103 can be saved onto the removable medium 113 (step S204). To this end, the CPU 101 confirms whether the removable medium 113 is coupled with the image processing apparatus 100 and confirms the remaining capacity of the removable medium 113, and so on.

When determining in step S204 that the image data in the RAM 103 cannot be saved onto the removable medium 113, the CPU 101 determines that the job cannot be continued and makes an error exit.

On the other hand, when determining in step S204 that the image data can be saved onto the medium 113, the CPU 101 selects image data to be saved onto the removable medium 113 (step S205). The details of the image data selection process in step S205 will be described later with reference to FIG. 5.

In step S206, the CPU 101 saves the image data selected in step S205 onto the removable medium 113 via the removable medium I/F 112.

In step S207, the CPU 101 stores in the RAM 103 a record indicating that the image data has been saved onto the removable medium 113, and returns to step S201 to continue the job.

Figure 5:
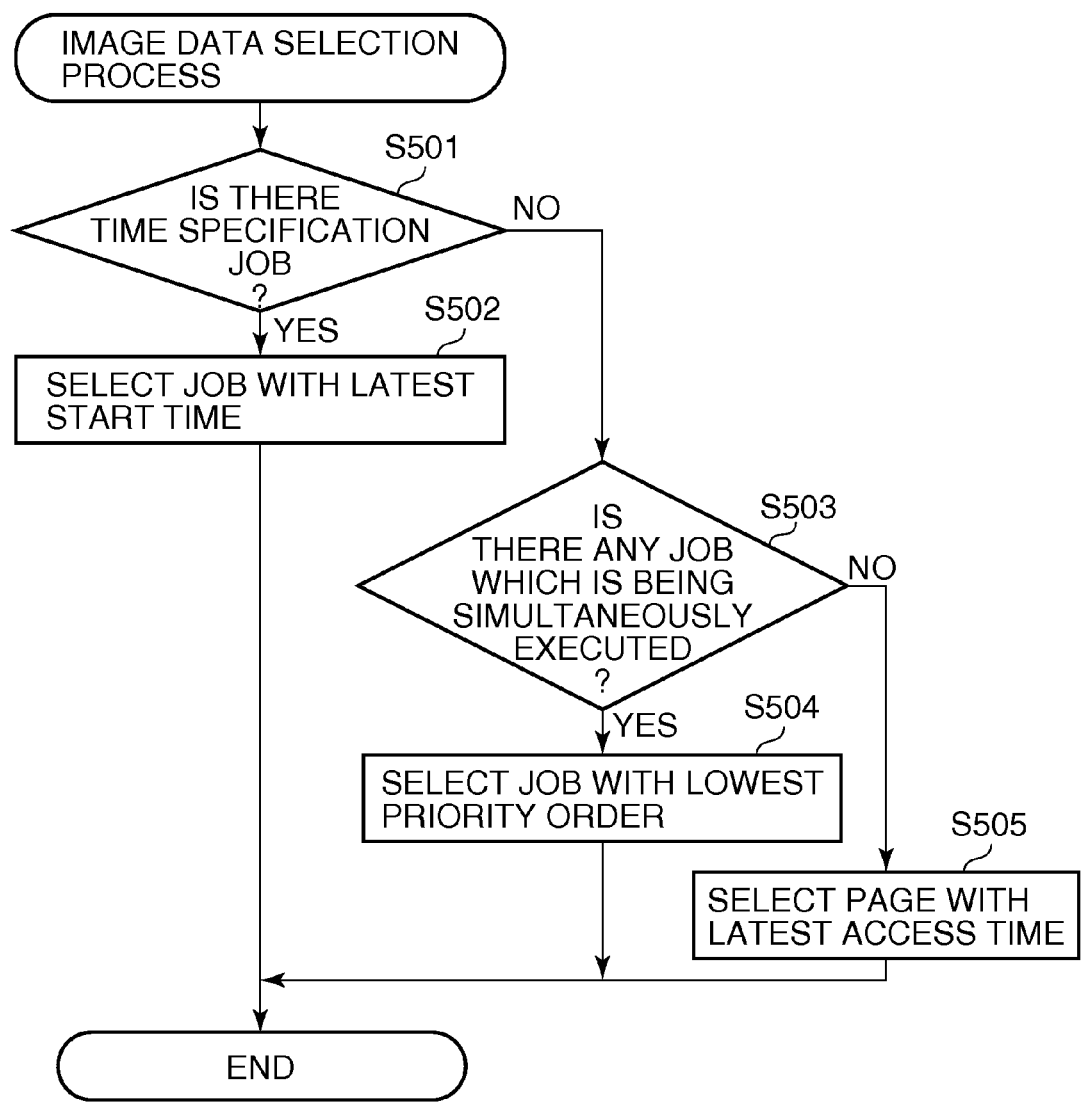
FIG. 5 is a flowchart showing the procedures of an image data selection process implemented in step S205 in FIG. 2 to select image data to be saved onto the removable medium.

FIG. 5 shows in flowchart the procedures of the image data selection process executed in step S205 in FIG. 2 to select image data to be saved onto the removable medium 113. In this process, the CPU 101 selects the image data to be saved onto the removable medium 113 according to a predetermined first priority order.

In step S501 in FIG. 5, the CPU 101 of the image processing apparatus 100 confirms whether there is any other job (time specification job (execution waiting job)).

When determining in step S501 that there is one or more time specification jobs, the CPU 101 selects therefrom image data for a job with the latest start time, as the data to be saved on the removable medium 113 (step S502).

Figure 6:
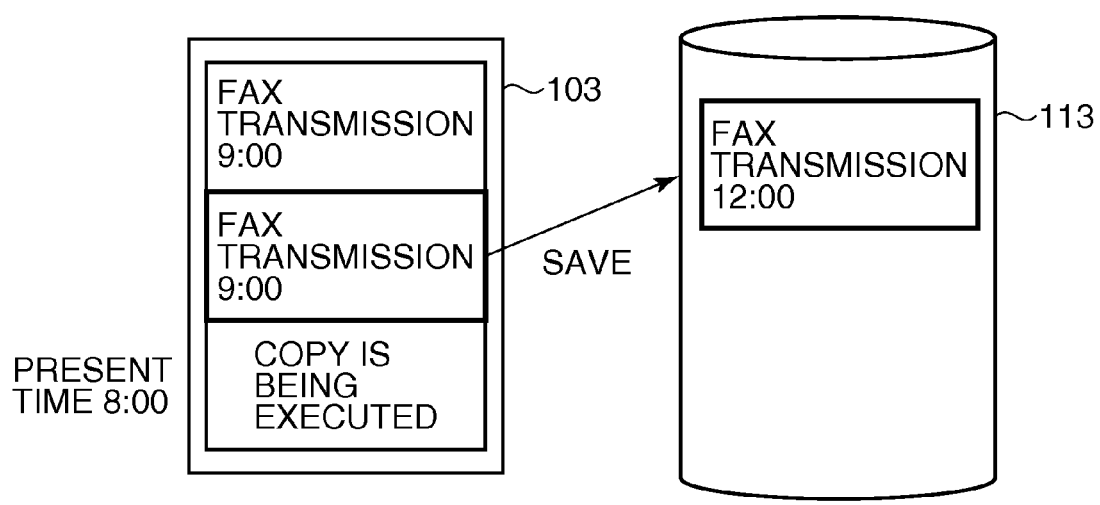
FIG. 6 is a view showing an example of image data selection according to the order of job start time.

FIG. 6 shows an example of image data selection according to the order of job start time.

In FIG. 6, a copy job is being performed at the present time (8:00) and there are FAX jobs with transmission start times at 9:00 and 12:00, and the RAM 103 is in a near memory full state. In that case, image data for the FAX job with the latest start time (12:00) is selected as the image data to be saved onto the removable medium 113.

By selecting the image data for the job with the latest start time, a save process to save the image data in the RAM 103 onto the removable medium 113 and a retrieval process to retrieve the image data from the removable medium 113 hardly overlap each other in execution time, making it possible to prevent a reduction in operation performance.

Referring to FIG. 5 again, when determining in step S501 that there is no time specification job, the CPU 101 confirms whether there is any other job which is being simultaneously executed (step S503).

When determining in step S503 that there is one or more jobs which are being simultaneously executed, the CPU 101 selects therefrom image data for a job with the lowest priority order as the image data to be saved (step S504).

Figure 7:
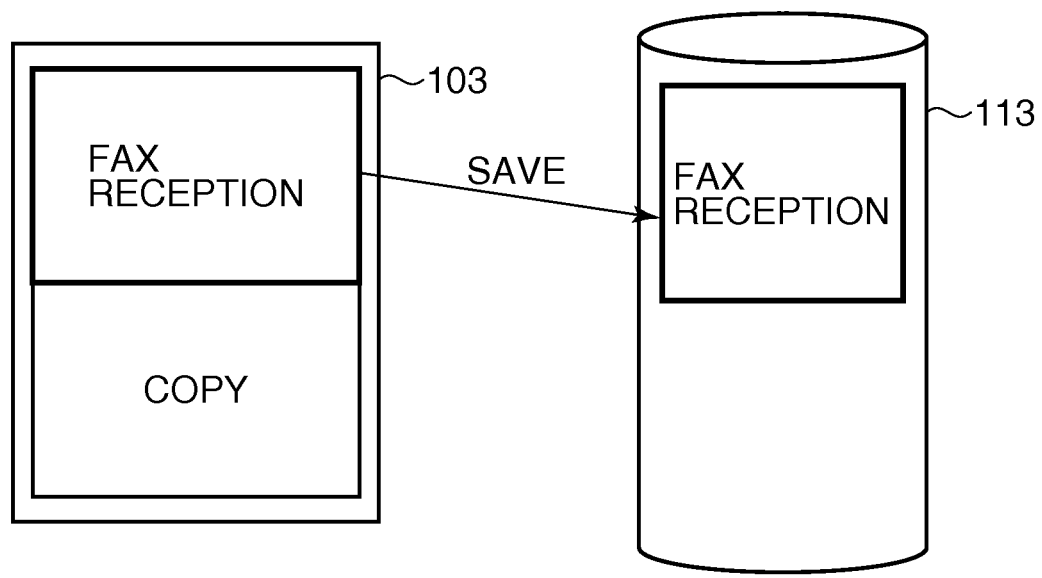
FIG. 7 is a view showing an example of image data selection according to the order of job priority.

FIGS. 7 and 8 show an example of image data selection according to the order of job priority.

Assuming that the order of job priority is determined in advance as shown in FIG. 8, when the memory becomes memory full as shown in FIG. 7 during execution of a FAX reception job and a copy job, image data for the FAX reception job with lower priority order is selected as the image data to be saved to thereby prevent a reduction in operation performance of foreground job.

When determining in step S503 there is no job which is being simultaneously executed, the CPU 101 selects, as the image data to be saved, image data for a page with the latest access time among pages of the currently executed job (step S505).

Figure 9:
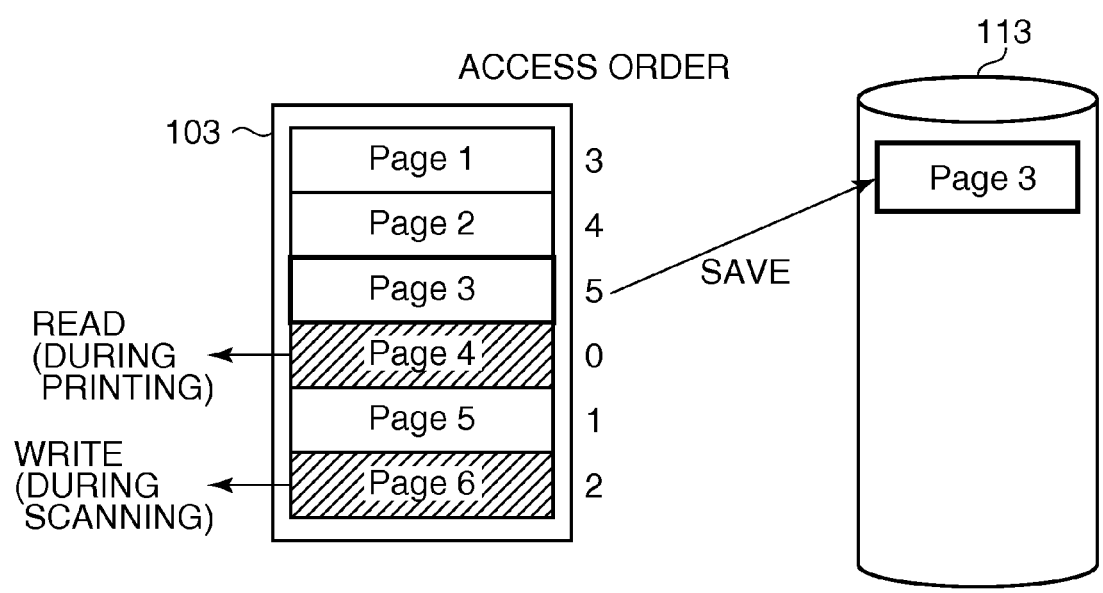
FIG. 9 is a view showing an example of image data selection according to page access time.

FIG. 9 shows an example of image data selection according to page access time.

During execution of a copy job for which sort-ON is specified, if the RAM 103 becomes memory full when the sixth page is being read and the fourth page is being printed, image data for the third page with the latest access time among subsequently accessed pages is selected as the image data to be saved.

By doing this, a save process to save the image data in the RAM 103 onto the removable medium 113 and a retrieval process to retrieve the image data from the removable medium 113 hardly overlap each other in execution time, and therefore a reduction in operation performance can be suppressed.

Figure 10:
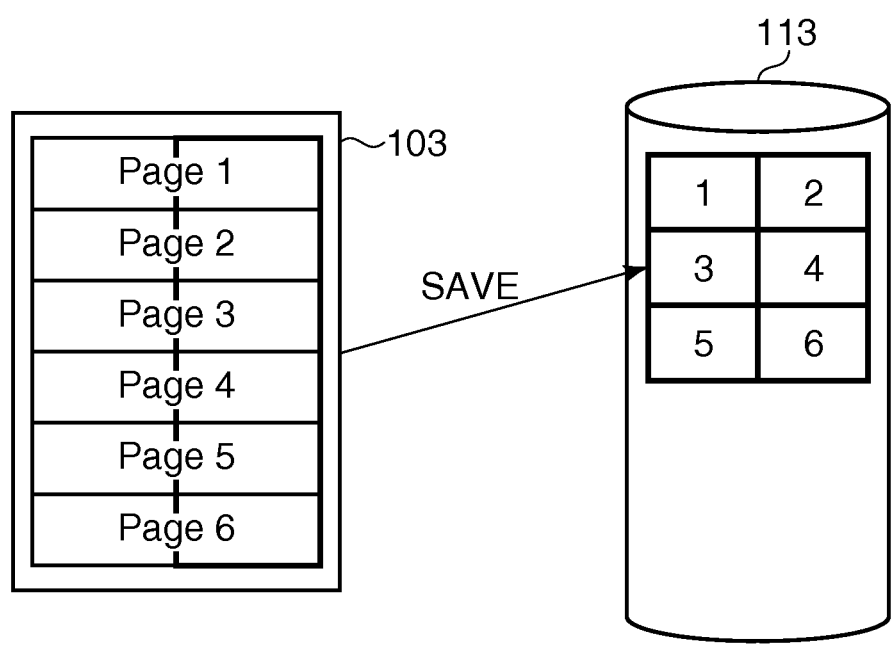
FIG. 10 is a view showing an example where image data for parts of respective pages are selected as image data to be saved.

FIG. 10 shows an example where image data for parts of respective pages are selected as the image data to be saved.

In this example, image data for predetermined parts of respective pages are selected as the image data to be saved. If, on the other hand, image data for a particular page is selected as the image data to be saved, the removable medium 113 is concentratedly accessed only at the time of printing the particular page, resulting in a possibility that a retrieval process to retrieve the image data from the removable medium 113 cannot follow the printing speed.

When the image data for the predetermined parts of respective pages are selected as the image data to be saved, the removable medium 113 are equally accessed at times of printing these pages, making it possible to suppress a reduction in operation performance.

As described above, in this embodiment, the predetermined first priority order (the order of priority in selecting image data to be saved onto the removable medium 113) is set such that the top priority is given to image data for at least one of a job with late job start time, a job with low order of job priority, and a page with late access time.

Figure 11:
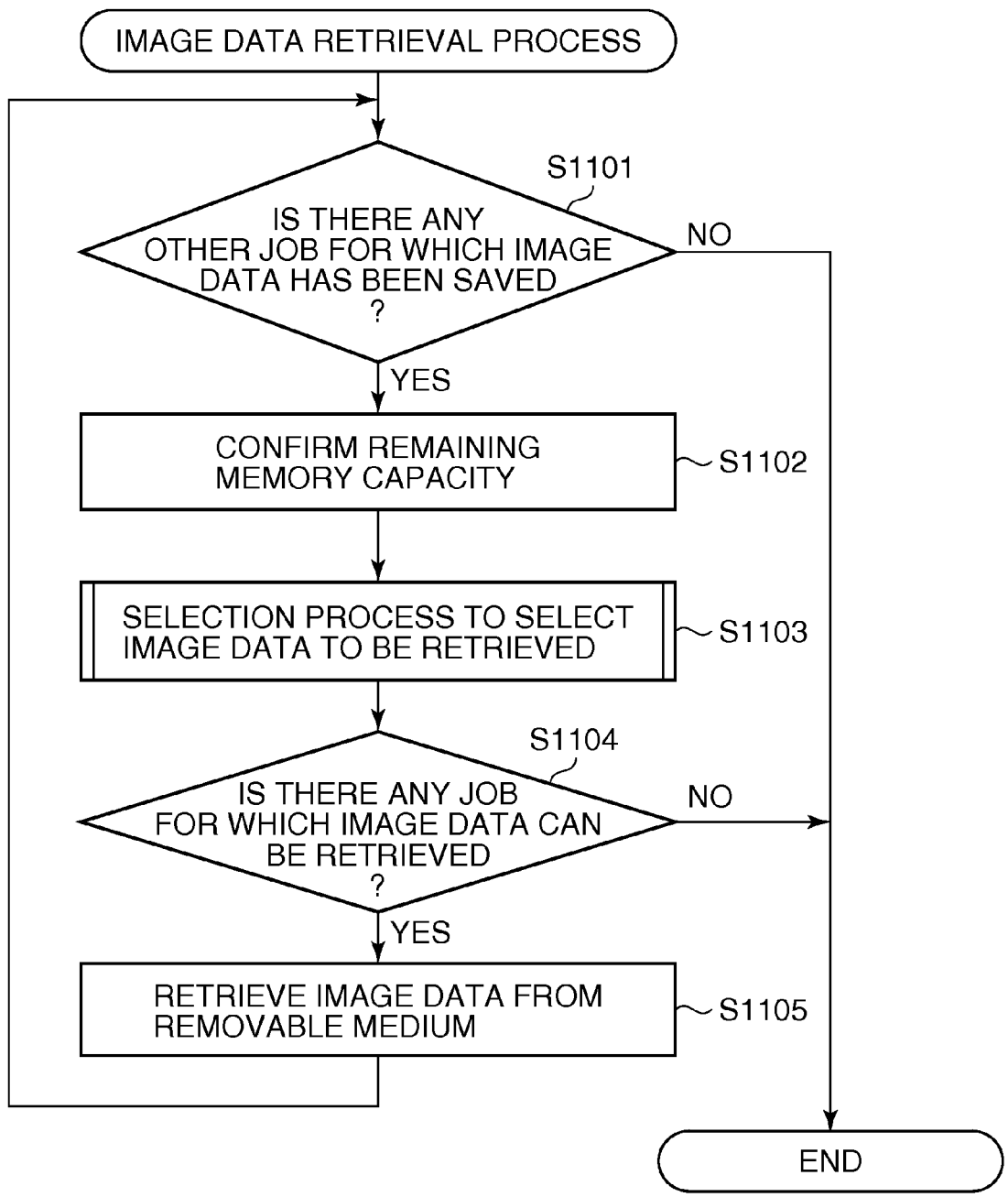
FIG. 11 is a flowchart showing the procedures of an image data retrieval process performed by the CPU of the image processing apparatus to retrieve image data from the removable medium.

FIG. 11 shows in flowchart the procedures of an image data retrieval process performed by the CPU 101 of the image processing apparatus 100 to retrieve image data from the removable medium 113.

Referring to FIG. 11, at job completion, the CPU 101 confirms whether there is any other job for which image data has been saved onto the removable medium 113 (step S1101).

When determining in step S1101 that there is no other job for which image data has been saved onto the removable medium 113, the CPU 101 completes the retrieval process.

On the other hand, when determining in step S1101 that there is other job for which image data has been saved onto the removable medium 113, the CPU 101 confirms the remaining memory capacity of the RAM 103 (step S1102).

In step S1103 (second selection unit), the CPU 101 selects image data to be retrieved from the removable medium 113. The details of the image data selection process in step S1103 will be described later with reference to FIG. 12.

In step S1104, based on the remaining memory capacity confirmed in step S1102 and a result of selection in step S1103 of image data to be retrieved from the removable medium 113, the CPU 101 determines whether there is any job for which image data can be retrieved from the removable medium 113.

When determining in step S1104 that there is no job for which image data can be retrieved from the removable medium 113, the CPU 101 completes the retrieval process.

On the other hand, when determining in step S1104 that there is a job for which image data can be retrieved from the removable medium 113, the CPU 101 retrieves the selected image data from the removable medium 113 into the RAM 103 (step S1105), and returns to step S1101.

Figure 12:
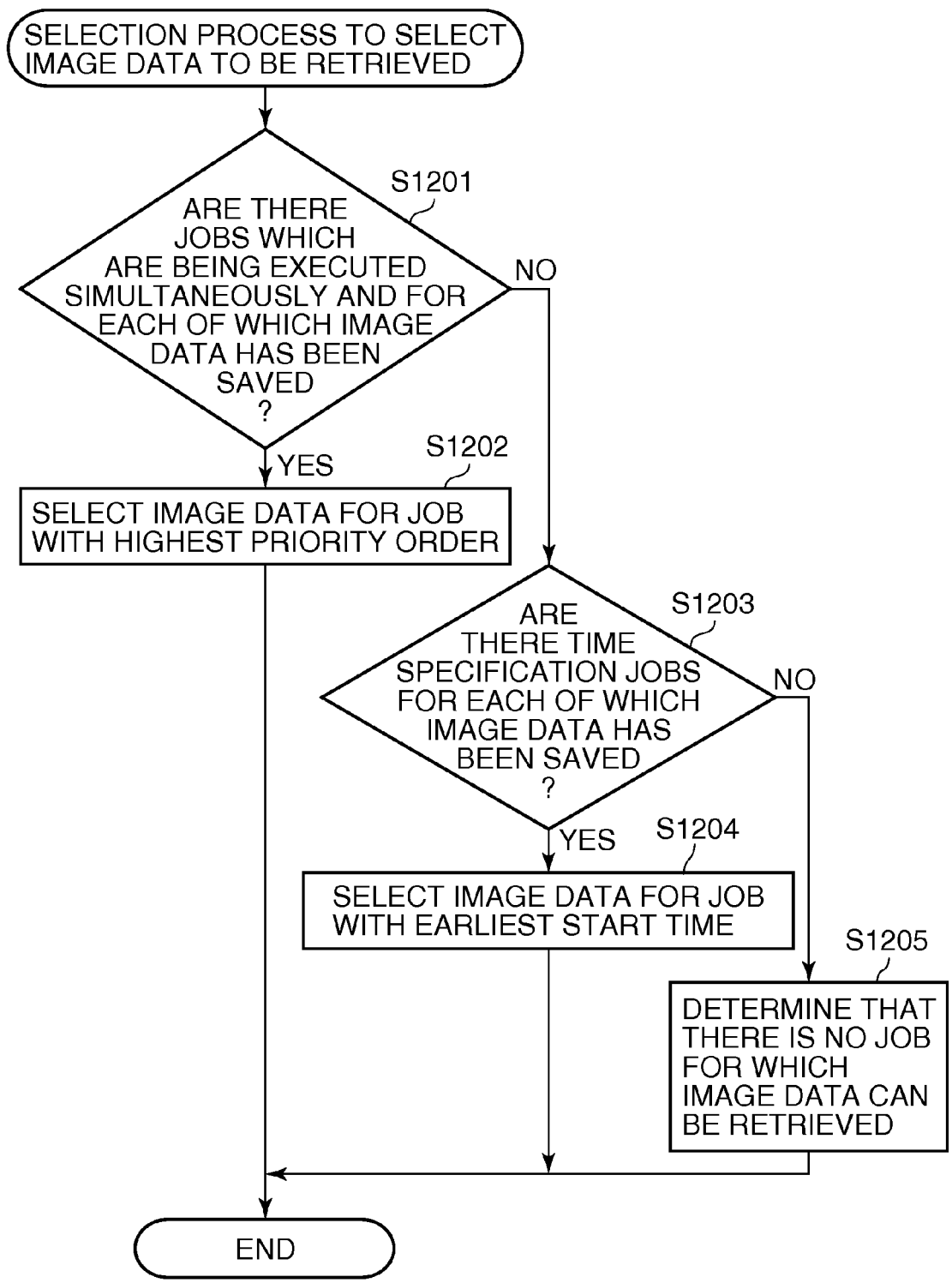
FIG. 12 is a flowchart showing the procedures of an image data selection process executed in step S1103 in FIG. 11 to select image data to be retrieved from the removable medium.

FIG. 12 shows in flowchart the procedures of the image data selection process executed in step S1103 in FIG. 11 to select image data to be retrieved from the removable medium 113. In this process, the CPU 101 selects image data to be retrieved from the removable medium 113 based on a predetermined second priority order.

In step S1201 in FIG. 12, the CPU 101 determines whether, among one or more jobs which are being executed simultaneously, there is one or more jobs for each of which image data has been saved onto the removable medium 113.

When determining in step S1201 that there is one or more jobs for each of which image data has been saved onto the removable medium 113, the CPU 101 selects, as the data to be retrieved, image data for a job with the highest priority order among the one or more jobs which are being simultaneously executed (step S1202).

On the other hand, when determining in step S1201 that the one or more jobs which are being executed simultaneously do not include one or more jobs for each of which image data has been saved onto the removable medium 113, the CPU 101 proceeds to step S1203.

In step S1203, the CPU 101 determines whether, among one or more time specification jobs, there is one or more jobs for each of which image data has been saved onto the removable medium 113.

When determining in step S1203 that among the one or more time specification jobs, there is one or more jobs for each of which image data has been saved onto the removable medium 113, the CPU 101 selects image data for a job with the earliest start time among them as the image data to be retrieved (step S1204).

On the other hand, when determining in step S1203 that the one or more time specification jobs do not include a job for which image data has been saved onto the removable medium 113, the CPU 101 determines that there is no job for which image data can be retrieved from the removable medium 113 (step S1205).

As described above, in this embodiment, the second priority order (the order of priority in selecting the image data to be retrieved from the removable medium 113) is set such that the top priority is given to image data for at least one of a job with high job priority order and a job with early job start time.

Figure 13:
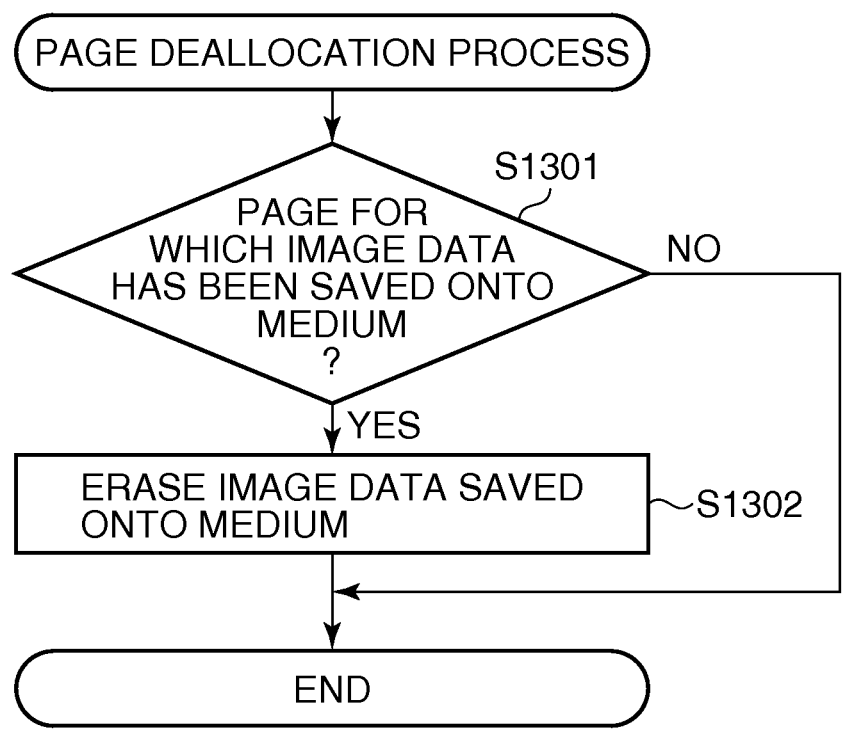
FIG. 13 is a flowchart showing the procedures of a page deallocation process performed by the CPU of the image processing apparatus to deallocate a page.

FIG. 13 shows in flowchart the procedures of a page deallocation process performed by the CPU 101 of the image processing apparatus 100 to deallocate a page.

Referring to FIG., 13, when processing on some page is completed and the page can be deallocated, the CPU 101 determines whether image data for that page has been saved onto the removable medium 113 (step S1301).

When determining in step S1301 that image data for the page has not been saved onto the removable medium 113, the CPU 101 completes the page deallocation process.

On the other hand, when determining in step S1301 that image data for the page has been saved onto the removable medium 113, the CPU 101 erases the image data saved onto the removable medium 113 (step S1302), and completes the page deallocation process.

Figure 14:
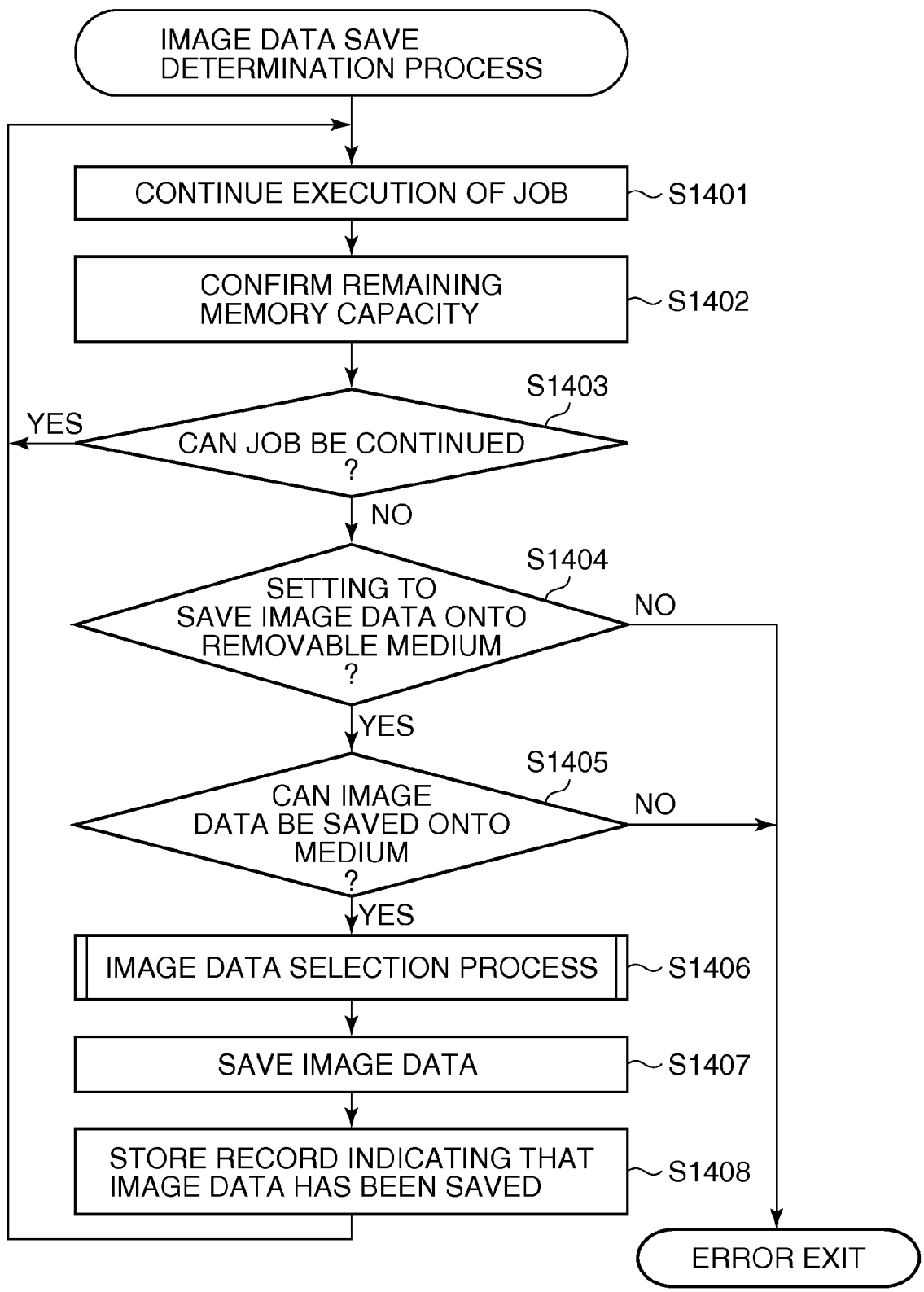
FIG. 14 is a flowchart showing the procedures of an image data save determination process performed by the CPU of the image processing apparatus to determine based on a setting value whether image data should be saved onto the removable medium.

FIG. 14 shows in flowchart the procedures of an image data save determination process performed by the CPU 101 of the image processing apparatus 100 to determine based on a setting value whether image data should be saved onto the removable medium 113.

Referring to FIG. 14, the CPU 101 carries out a job using the RAM 103 (step S1401).

In step S1402, the CPU 101 confirms the remaining memory capacity of the RAM 103. In step S1403, based on the remaining memory capacity confirmed in step S1402 and a job operation mode, the CPU 101 determines whether the job can be continued by using only the RAM 103.

When determining in step S1403 that the job can be continued, the CPU 101 returns to step S1401 to continue the job.

On the other hand, when determining in step S1403 that the job cannot be continued, the CPU 101 reads a predetermined setting value and determines whether the setting is made to save image data from the RAM 103 onto the removable medium 113 (step S1404 (second determination unit)).

It should be noted that the predetermined setting value can be set by the user by operating the operation/display unit 106. Alternatively, the image processing apparatus 100 may be configured to have a plurality of removable medium I/Fs 112 for each of which whether image data should be saved onto the removable medium 113 can be set.

Furthermore, whether image data should be saved onto the removable medium 113 can be switched according to an intended purpose of the removable medium 113. For example, if the intended purpose of the removable medium 113 is "Mdeia Direction Print" or "Scan To Mdeia", it is determined that image data should not be saved onto the removable medium 113.

The "Mdeia Direction Print" is a function of printing an image file stored in the removable medium 113 directly to the printer 105. The "Scan To Mdeia" is a function of saving, as an image file, image data read by the scanner 104 onto the removable medium 113.

When determining in step S1404 that the setting is made such that image data should not be saved onto the removable medium 113, the CPU 101 determines that the job cannot be continued and makes an error exit.

On the other hand, when determining in step S1404 that the setting is made such that image data should be saved onto the removable medium 113, the CPU 101 determines whether image data in the RAM 103 can be saved onto the removable medium 113 (step S1405). To this end, the CPU 101 confirms whether the removable medium 113 is coupled with the image processing apparatus 100 and confirms the remaining capacity of the removable medium 113, etc.

When determining in step S1405 that the image data cannot be saved onto the removable medium 113, the CPU 101 determines that the job cannot be continued and makes an error exit.

On the other hand, when determining in step S1405 that the image data can be saved onto the removable medium 113, the CPU 101 performs an image data selection process corresponding, e.g., to the process shown in FIG. 5 to thereby select image data to be saved onto the removable medium 113 (step S1406).

In step S1407, the CPU 101 saves the image data selected in step S1406 onto the removable medium 113 via the removable medium I/F 112.

In step S1408, the CPU 101 stores into the RAM 103 a record indicating that the image data has been saved onto the removable medium 113, and returns to step S1401 to continue the job.

Figure 15:
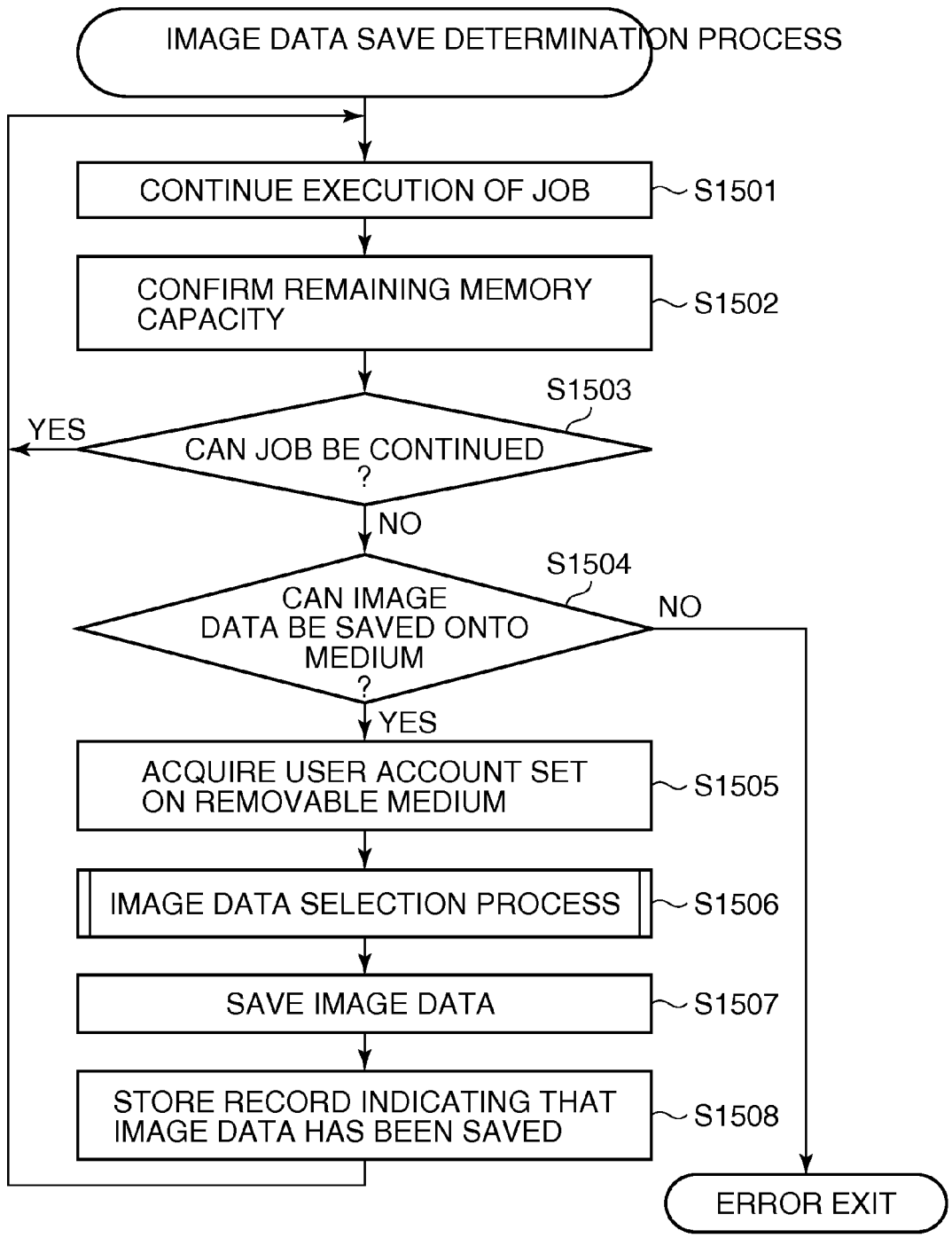
FIG. 15 is a flowchart showing the procedures of an image data save determination process performed by the CPU of the image processing apparatus to determine based on user account information whether image data should be saved onto the removable medium.

FIG. 15 shows in flowchart the procedures of an image data save determination process performed by the CPU 101 of the image processing apparatus 100 to determine based on user account information whether image data should be saved onto the removable medium 113.

Referring to FIG. 15, the CPU 101 executes a job using the RAM 103 in step S1501.

In step S1502, the CPU 101 confirms the remaining memory capacity of the RAM 103. In step S1503, based on the remaining memory capacity confirmed in step S1502 and a job operation mode, the CPU 101 determines whether the job can be continued by using only the RAM 103.

When determining in step S1503 that the job can be continued, the CPU 101 returns to step S1501 to continue the job.

On the other hand, when determining in step S1503 that the job cannot be continued, the CPU 101 determines whether image data in the RAM 103 can be saved onto the removable medium 113 (step S1504). To this end, the CPU 101 confirms whether the removable medium 113 is coupled with the image processing apparatus 100 and confirms the remaining capacity of the removable medium 113, etc.

When determining in step S1504 that the image data cannot be saved onto the removable medium 113, the CPU 101 determines that the job cannot be continued and performs an error exit.

On the other hand, when determining in step S1504 that the image data can be saved onto the removable medium 113, the CPU 101 acquires a user account set on the removable medium 113 (step S1505).

In step S1506, the CPU 101 performs an image data selection process corresponding, e.g., to the process shown in FIG. 5 to thereby select image data to be saved onto the removable medium 113. At that time, the CPU 101 selects only image data for one or more jobs for each of which the same user account as that acquired in step S1505 is set. By doing this, image data for a job for a different user can be prevented from being saved onto the removable medium 113.

In step S1507, the CPU 101 saves image data selected in step S1506 onto the removable medium 113 via the removable medium I/F 112.

In step S1508, the CPU 101 stores into the RAM 103 a record indicating that the image data has been saved onto the removable medium 113, and returns to step S1501 to continue the job.

As described above, with this embodiment, the removable medium can effectively be used as a temporary alternative memory when the capacity of the memory in the image processing apparatus becomes deficient. Thus, the frequency of use of the removable medium is made as small as possible to prolong the service life of the removable medium, and the removable medium can be used while suppressing a reduction in performance of the process being executed to a minimum.

It is to be understood that the present invention may also be accomplished by supplying a system or an apparatus with a storage medium in which a program code of software, which realizes the functions of the above described embodiment is stored and by causing a computer (or CPU or MPU) of the system or apparatus to read out and execute the program code stored in the storage medium.

In that case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, and a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-182722, filed Jul. 14, 2008, which is hereby incorporated by reference herein in its entirety.

What is claimed is:

1. An image processing apparatus comprising:
a storage unit adapted to store image data;
a confirmation unit adapted to confirm a remaining capacity of said storage unit;
a determination unit adapted to determine, based on a result of confirmation by said confirmation unit, whether execution of a first job using said storage unit can be continued;
a selection unit adapted to, when it is determined by said determination unit that execution of the first job cannot be continued:
(a) if image data for a second job which is different from the first job and waits to be executed exists among the image data stored in the storage unit, select the image data for the second job from among the image data stored in said storage unit,
(b) if (i) the image data for the second job does not exist among the image data stored in the storage unit, (ii) image data for a third job which is different from the first job and is being executed in parallel with the first job exists among the image data stored in the storage unit, and (iii) a priority of the third job is lower than a priority of the first job, select the image data for the third job from among the image data stored in said storage unit, and,
(c) if the image data for the third job does not exist among the image data stored in the storage unit, select a part of the image data for the first job stored in the storage unit; and
a save unit adapted to save the image data selected by said selection unit from said storage unit onto another storage unit.

2. The image processing apparatus according to claim 1, including:
a second selection unit adapted to select the image data to be retrieved from the other storage unit to said storage unit in accordance with a predetermined priority order after completion of the first job; and
a retrieval unit adapted to retrieve the image data selected by said second selection unit from the other storage unit to said storage unit.

3. The image processing apparatus according to claim 2, wherein the priority order is set such that image data for (a) a job with higher job priority order, (b) a job with earlier job start time, or both (a) and (b) is or are selected as the image data to be retrieved from the other storage unit.

4. The image processing apparatus according to claim 1, including:
an erasure unit adapted to erase the image data saved onto the other storage unit from said storage unit.

5. The image processing apparatus according to claim 1, including:
a second determination unit adapted, based on a predetermined setting value, to determine whether the image data should be saved onto the other storage unit.

6. The image processing apparatus according to claim 1, wherein said selection unit is adapted, based on user account information, to select the image data to be saved onto the other storage unit.

7. The image processing apparatus according to claim 1, wherein said selection unit is adapted to select, when said storage unit stores image data for respective jobs, a job start time of each of which is specified, the image data for the job of which the job start time is the latest as the image data for the second job.

8. The image processing apparatus according to claim 1, wherein the first job using said storage unit is directed to a copy job.

9. The image processing apparatus according to claim 1, wherein the selection unit is adapted to select the image data for the second job of which a job start time is specified.

10. The image processing apparatus according to claim 9, wherein the second job of which the job start time is specified starts a FAX transmission at the specified start time.

11. The image processing apparatus according to claim 9, further comprising a second determination unit adapted to determine, when the image data for the second job of which the job start time is specified does not exist among the image data stored in said storage unit, whether another job which is being executed in parallel to the first job exists,
wherein said selection unit is adapted to select, when the other job which is executed in parallel to the first job exists and a priority of the other job is lower than a priority of the first job, image data for the other job from among the image data stored in said storage unit, and to select, when the other job which is executed in parallel to the first job does not exist, image data of one page of which a page access time is the latest, from among the image data for the first job stored in the storage unit.

12. The image processing apparatus according to claim 1, wherein the selection unit is adapted to, if the image data for the third job does not exist among the image data stored in the storage unit, select the part of the image data for the first job stored in the storage unit of which an access time is the latest.

13. The image processing apparatus according to claim 12, further comprising:
an interface unit adapted to be coupled with a removable medium.

14. The image processing apparatus according to claim 1, wherein the other storage unit is a removable medium.

15. An image processing method comprising:
a storage step of storing image data into a storage unit;
a confirmation step of confirming a remaining capacity of said storage unit;
a determination step of determining, based on a result of confirmation in said confirmation step, whether execution of a first job using the storage unit can be continued;
a selection step of, when it is determined in said determination step that execution of the first job cannot be continued:
(a) if there is image data for a second job which is different from the first job and waits to be executed in the image data stored in the storage unit, selecting the image data for the second job from among the image data stored in said storage unit,
(b) if (i) there is not the image data for the second job, (ii) there is image data for the third job which is different from the first job and is being executed in parallel with the first job in the image data stored in the storage unit, and (iii) a priority of the third job is lower than a priority of the first job, selecting the image data for the third job from among the image data stored in said storage unit, and
(c) if there is not the image data for the third job, selecting a part of the image data for the first job stored in the storage unit; and
a save step of saving the image data selected in said selection step from said storage unit onto another storage unit.

16. A non-transitory computer-readable storage medium storing a program configured to be executed at least by a computer of an image processing apparatus, the program comprising:
storage instructions configured to store image data into a storage unit;
confirmation instructions configured to confirm a remaining capacity of said storage unit;
determination instructions configured to determine, based on a result of confirmation according to said confirmation instructions, whether execution of a first job using the storage unit can be continued;
selection instructions configured to, when it is determined according to said determination instructions that execution of the first job cannot be continued:
(a) if there is image data for a second job which is different from the first job and waits to be executed in the image data stored in the storage unit, select the image data for the second job from among the image data stored in said storage unit,
(b) if (i) there is not the image data for the second job, (ii) there is image data for a third job which is different from the first job and is being executed in parallel with the first job in the image data stored in the storage unit, and (iii) a priority of the third job is lower than a priority of the first job, select the image data for the third job from among the image data stored in said storage unit, and
(c) if there is not the image data for the third job, select a part of the image data for the first job stored in the storage unit; and
save instructions configured to save the image data selected according to said selection instructions from said storage unit onto another storage unit.

* * * * *